Patented Dec. 12, 1922.

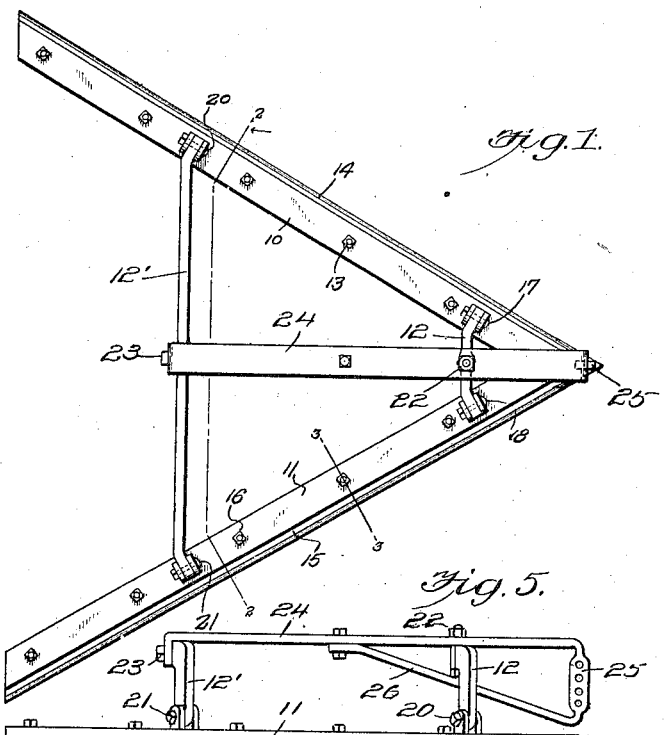
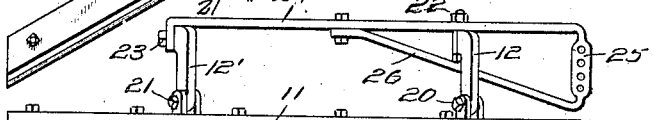
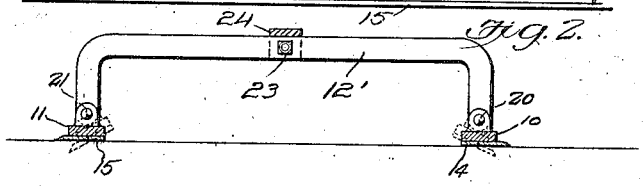
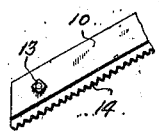

1,438,857

UNITED STATES PATENT OFFICE.

GEORGE REINSMITH, OF FOWLER, MICHIGAN, ASSIGNOR TO FRED N. HAUCK, OF FOWLER, MICHIGAN.

WEED CUTTER.

Application filed January 13, 1922. Serial No. 529,074.

*To all whom it may concern:*

Be it known that I, GEORGE REINSMITH, a citizen of the United States, residing at Fowler, in the county of Clinton and State of Michigan, have invented certain new and useful Improvements in Weed Cutters, of which the following is a specification.

This invention relates to weed cutters, and has for one of its objects to provide a simply constructed implement adapted to operate at a predetermined distance beneath the upper surface of the soil and operate over a wide "swath" or area.

With these and other objects in view the invention consists in certain novel features of construction as hereinafter shown and described and then specifically pointed out in the claims and in the drawings illustrative of the preferred embodiment of the invention:—

Figure 1 is a plan view of the improved implement.

Fig. 2 is a transverse section on the line 2—2 of Fig. 1.

Fig. 3 is a transverse section on the line 3—3 of Fig. 1.

Fig. 4 is a detail view illustrating a modification in the form of a cutting blade.

Fig. 5 is a side elevation of the structure as shown in Fig. 1.

The improved implement comprises co-acting beam members 10 and 11 diverging from the front to the rear and coupled near their forward and rear ends by upwardly coupling arching bars 12 and 12'.

The beams 10 and 11 are beveled at their converging ends so that they unitedly present a pointed forward end of the implement, as shown in Fig. 1.

Attached to the lower face of the beam 10 by bolts or like fastening devices 13 is a plate 14, while a similar plate 15 is attached to the lower face of the beam 11 by bolts or like fastening devices 16, the heads of the bolts being countersunk in the plates as illustrated in Fig. 3, so that no projections are presented below the lower faces of the plates.

The plates 10 and 11 are swingingly coupled at 17 and 18 to the bar 12 near their forward ends while the bar 12' is swingingly coupled at 20 and 21 to the beams nearer their rear ends, as shown.

The beams 10 and 11 are thus adapted to be slightly tilted or set at a slight incline to the horizontal as shown by dotted lines in Fig. 2, to cut into the soil with greater freedom as the implement is moved forwardly, if required.

In Figs. 1, 2 and 3 the cutting edges of the plates 14 and 15 are without indentations or teeth, while in Fig. 4 the cutting edge is serrated, or in saw tooth form. Any desired form or configuration may be imparted to the edges of the blades.

Attached at 22 and 23 to the coupling bars 12 and 12' is a pull member 24, the latter extending forwardly of the bar 12 and downwardly as at 25, the downturned portion being provided with a plurality of spaced apertures and constituting a clevis device to receive the draft appliances, not shown. The clevis portion 25 is reinforced and supported from the member 24 by an oblique brace 26.

By this simple means, a very strong and compact device is produced which is very effectual for severing weeds and other deleterious plant growths a short distance below the surface of the ground, and may be operated by draft animals, motor driven tractors or other means, and uniformly severs obnoxious growths and causes the severed plants to be fed in uniform streams over the diverging beams and beneath the upwardly arching coupling bars 12 and 12', as will be obvious.

The improved implement may be constructed of any suitable material and of any required size and adapted for use in connection with any species of weeds or other growth.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. A weed cutter comprising beam members diverging from the front to the rear, connecting members in spaced relation and swingingly coupled respectively to said beams, a pull member attached to said connecting members and having a downturned forward end adapted to receive a draft appliance, and blades attached to the under faces of said beams and extending beyond the outer faces of the same, the outer edges of said blades being in cutting form.

2. A weed cutter comprising beam members diverging from the front to the rear, coupling means applied to said beams, connecting members in spaced relation and swingingly coupled respectively to said beams, and blades attached to the under faces of said beams and extending beyond the outer faces of the same, the outer edges of said blades being in cutting form.

3. An implement of the class described comprising a support adapted to receive a draft appliance, beam members diverging from front to rear, cutting blades attached to said beams, and means for swingingly coupling said beam members to said support.

4. An implement of the class described comprising a support adapted to receive a draft appliance, cutting blades associated with said support, and diverging from front to rear and means for swingingly coupling said blades to said support.

In testimony whereof, I affix my signature hereto.

GEORGE $\overset{\text{his}}{\times}$ REINSMITH.
mark

Witness to George Reinsmith's signature:
A. O. FREEMAN.